United States Patent
Yang

(10) Patent No.: US 10,341,034 B2
(45) Date of Patent: Jul. 2, 2019

(54) DYNAMIC LTE SIGNAL DETECTION

(71) Applicant: Avago Technologies International Sales PTE. Limited, Singapore (SG)

(72) Inventor: Baoguo Yang, Saratoga, CA (US)

(73) Assignee: Avago Technologies International Sales PTE. Limited, Singapore (SG)

(*) Notice: Subject to any disclaimer, the term of this patent is extended or adjusted under 35 U.S.C. 154(b) by 173 days.

(21) Appl. No.: 14/885,562

(22) Filed: Oct. 16, 2015

(65) Prior Publication Data

US 2016/0127057 A1 May 5, 2016

Related U.S. Application Data

(60) Provisional application No. 62/074,339, filed on Nov. 3, 2014.

(51) Int. Cl.
*H04B 17/345* (2015.01)
*H04W 16/14* (2009.01)

(52) U.S. Cl.
CPC .......... *H04B 17/345* (2015.01); *H04W 16/14* (2013.01)

(58) Field of Classification Search
None
See application file for complete search history.

(56) References Cited

U.S. PATENT DOCUMENTS

| | | | | |
|---|---|---|---|---|
| 9,825,748 B2* | 11/2017 | Liang | ............... | H04L 5/0073 |
| 2011/0211659 A1* | 9/2011 | Kosakowski | ....... | H03M 13/413 |
| | | | | 375/341 |
| 2013/0272260 A1* | 10/2013 | Bitran | ............... | H04W 16/14 |
| | | | | 370/329 |
| 2014/0199991 A1* | 7/2014 | Mukherjee | .......... | H03M 13/612 |
| | | | | 455/422.1 |
| 2015/0215471 A1* | 7/2015 | Ljung | ............... | H04M 15/58 |
| | | | | 455/405 |
| 2016/0037520 A1* | 2/2016 | Wang | ............... | H04W 72/0453 |
| | | | | 370/329 |
| 2016/0037544 A1* | 2/2016 | Wang | ............... | H04W 72/1215 |
| | | | | 370/329 |
| 2016/0073344 A1* | 3/2016 | Vutukuri | ........... | H04W 52/0216 |
| | | | | 370/252 |

OTHER PUBLICATIONS

Broadcom Corporation, Cablelabs, Deployment and Evaluation Considerations for LAA-LTE (R1-144234), Written Contribution at 3GPP Meeting, Ljubljana, Slovenia, Oct. 6-10, 2014, 2 pages.

(Continued)

*Primary Examiner* — Adnan Baig
(74) *Attorney, Agent, or Firm* — Foley & Lardner LLP

(57) ABSTRACT

Systems and methods allow LAA LTE equipment to coexist with other services in the unlicensed band such as WIFI or WLAN services. Systems and methods use LTE reference signals in the unlicensed spectrum that are not continuous and can be interrupted by a WIFI signal or other services in the unlicensed band or use a dynamic LAA ON burst or window to provide the LTE reference signals in some embodiments. The systems and methods can detect the presence of LTE signals using a one or more of a number of techniques.

20 Claims, 6 Drawing Sheets

(56) References Cited

OTHER PUBLICATIONS

Broadcom Corporation, Cablelabs, PHY enhancement areas & options to support robust coexistence LAA (R1-144233), Written Contribution at 3GPP Meeting, Ljubljana, Slovenia, Oct. 6-10, 2014, 3 pages.
Broadcom Corporation, Cablelabs, Robust-Coexistence Considerations for LAA-LTE (R1-144232), Written Contribution at 3GPP Meeting, Ljubljana, Slovenia, Oct. 6-10, 2014, 2 pages.
Ericsson et al., Study on Licensed-Assisted Access using LTE (RP-141664), Written Contribution at 3GPP Meeting, Edinburgh, Scotland, Sep. 9-12, 2014, 8 pages.
Wi-Fi Alliance, Wi-Fi Certified Voice-Enterprise: Delivering Wi-Fi voice to the enterprise, dated May 2012, 11 pages.

* cited by examiner

DYNAMIC LTE SIGNAL DETECTION

CROSS REFERENCE TO RELATED APPLICATIONS

The present application claims the benefit of and priority to U.S. Provisional Application. No. 62/074,339, filed on Nov. 3, 2014, entitled "DYNAMIC LTE SIGNAL DETECTION," which is incorporated herein by reference in its entirety.

FIELD

The present disclosure relates generally to the field of communications, including, but not limited to, communications that detect presence of Long-Term Evolution (LTE) signals in an unlicensed spectrum and/or requests a window for transmitting LTE reference signals in the unlicensed spectrum.

BACKGROUND

Long term evolution (LTE) is a standard for wireless communication. Licensed-assisted access (LAA) LTE formerly known as LTE-U (or unlicensed LTE) generally makes use of an unlicensed band or spectrum (i.e., a spectrum not reserved for a particular company, network, etc.). LTE transmissions in the unlicensed spectrum can address spectrum shortage issues in the licensed or LTE band. Interference can occur when operating in the unlicensed spectrum.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

A. Computing and Network Environment

Figure 1A:
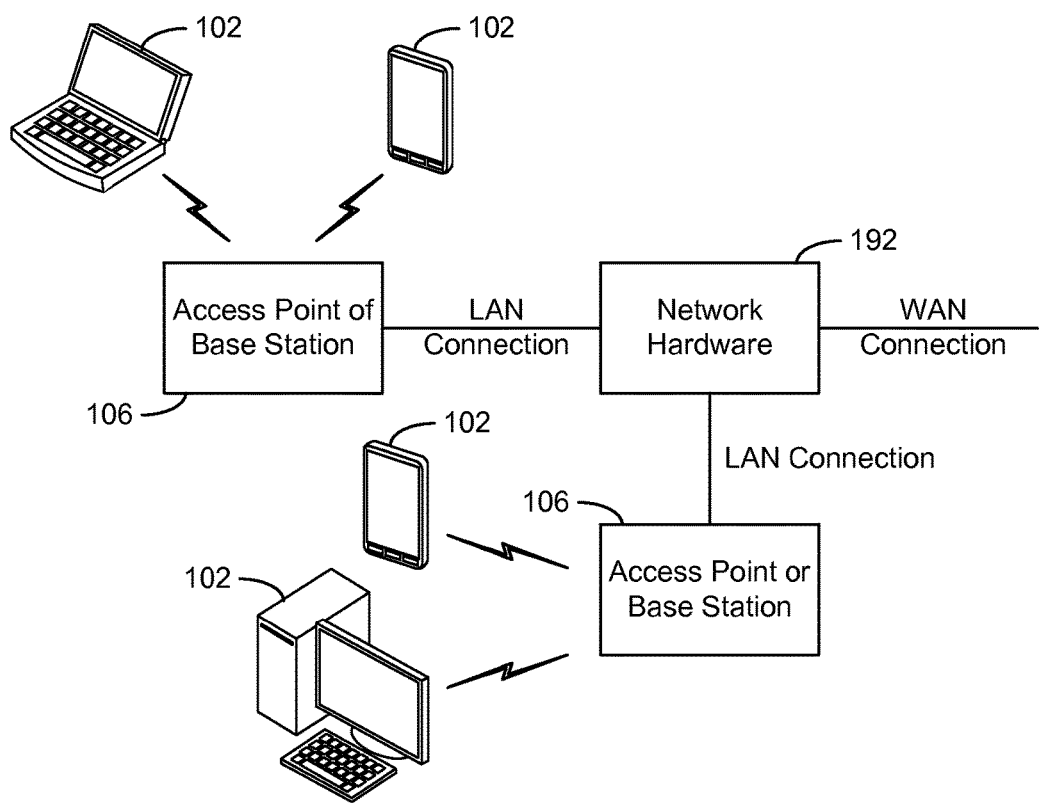
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device," "user equipment (UE)," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B," "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, the base station 106 includes a device or module (including a combination of hardware and software) that allows wireless communication devices 102 to connect to a wired network using LTE, WIFI, and/or other standards. The base station 106 can be implemented, designed and/or built for operating in a WLAN and in a cellular network. The base station 106 can connect to a router (e.g., via a wired network) as a standalone device in some embodiments. In other embodiments, the base station 106 can be a component of a router. The base station 106 can provide multiple devices 102 access to a network. The base station 106 can, for example, connect to a wired Ethernet connection and provide wireless connections using radio frequency links for other devices 102 to utilize that wired connection. The base station 106 can be built and/or implemented to support a standard for sending and receiving data using one or more radio frequencies. Those standards and the frequencies they use can be defined by the IEEE or 3GPP for example. The base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more of the base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
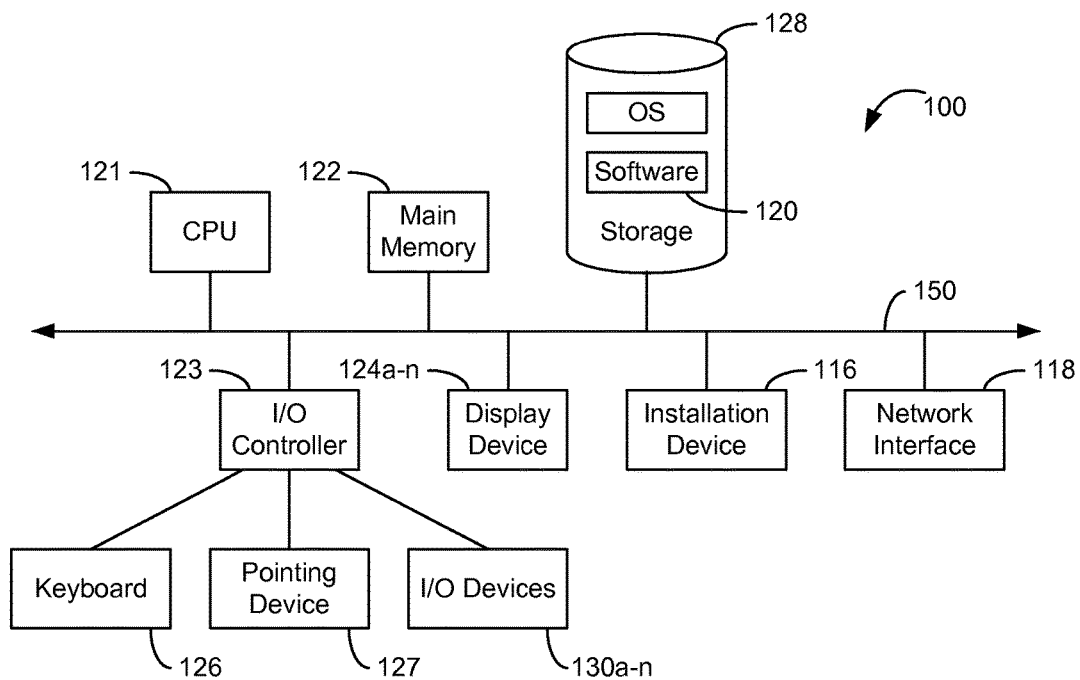
FIGS. 1B and 1C are block diagrams depicting embodiments of computing devices useful in connection with the methods and systems described herein.
Figure 1C:
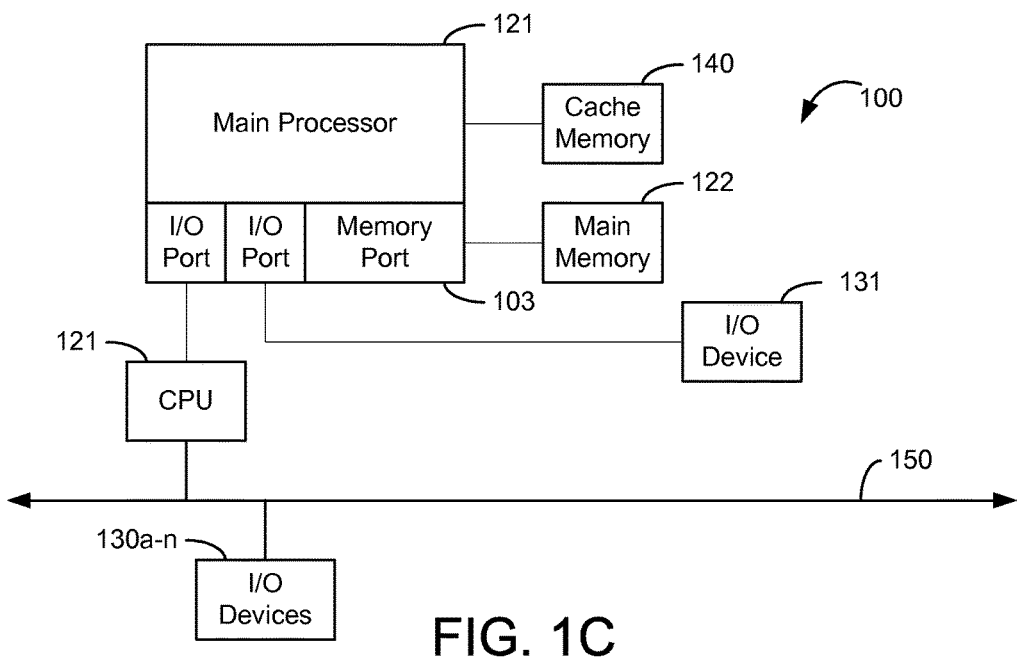

The communications device(s) 102 and the base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the central processing unit 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the central processing unit 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main central processing unit 121 communicates directly with cache memory 140 via a secondary bus, sometimes referred to as a backside bus. In other embodiments, the main central processing unit 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the central processing unit 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the central processing unit 121 can use an Advanced Graphics Port (AGP) to communicate with the display 124. FIG. 1C depicts an embodiment of a computing device 100 in which the main central processing unit 121 can communicate directly with I/O device 130b, for example via HYPERTRANSPORT, RAPIDIO, or INFINIBAND communications technology. FIG. 1C also depicts an embodiment in which local busses and direct communication are mixed: the central processing unit 121 communicates with I/O device 130a using a local interconnect bus while communicating with I/O device 131 directly.

A wide variety of I/O devices 130a-n and 131 (FIG. 1C) can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller 123 can control one or more I/O devices such as a keyboard 126 and a pointing device 127, e.g., a mouse or optical pen. Furthermore, an I/O device can also provide storage and/or an installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple display devices 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computing device 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. LTE Reference Signal Window Request and LTE Signal Detection

LAA LTE is a standard for wireless communication that makes use of the unlicensed spectrum. In some embodiments, systems and/or methods detect LAA LTE signals in the unlicensed spectrum or band and/or systems and/or methods provide a window for LTE reference signal (RS) transmissions in the unlicensed spectrum or band according to some embodiments. WLAN frequency bands are generally unlicensed for use by LTE devices. LAA LTE is sometimes referred to as LTE-unlicensed (LTE-U), LTE for unlicensed spectrum, or LAA using LTE over unlicensed, and any these terms may be used interchangeably in this disclosure.

In some embodiments, an LAA LTE access point and one or more WIFI access points are integrated within a device (e.g, small cell, user equipment, phone, handsets, access point, eNodeB (eNB), laptops, tablets, etc.) to improve the use of the unlicensed spectrum. In some embodiments, a small cell or other device design is configured to support concurrent dual-band WIFI access points (e.g., dual-band 802.11n and 802.11ac). In various embodiments, the small cell or other device design is configured to provide solutions relating to providing LAA LTE transmissions (e.g., LTE signals in the unlicensed spectrum) to accommodate unlicensed spectrum regulation. For example, in some regions in the world, transmissions in the unlicensed spectrum are provided according to certain regulations, e.g., listen before talk (LBT) or other protocols that attempt to minimize interference with other users of the unlicensed spectrum.

In some embodiments, systems and methods allow LAA LTE equipment to robustly coexist with other services in the unlicensed band such as WIFI or WLAN services. In some embodiments, systems and methods use LTE reference signals in the unlicensed spectrum that are not continuous and can be interrupted by a WIFI signal or other services in the unlicensed band. The systems and methods use LTE reference signals, such as, a cell specific reference signal (CRS), a primary synchronization signal (PSS), a secondary synchronization signal (SSS), a positioning reference signal (PRS), a channel state information reference signal (CSI-RS), discovery reference signals (DRS), etc. that are provided in LAA ON period in some embodiments.

Systems and methods use a dynamic LAA ON burst or window to provide the LTE reference signals in some embodiments. In some embodiments, the starting time and the duration of LAA ON burst are both dynamic and user equipment is not aware of the ON burst except through packet data control channel decoding such as, physical downlink control channel (PDCCH) or enhanced PDCCH (EPDCCH) decoding. In some embodiments, the LAA ON burst does not occupy the channel for a long time, such as, 100 ms or more if there is significant WIFI traffic in the unlicensed channel because it may impact the WIFI quality of service (QOS).

The legacy LTE standard includes some continuity assumptions. First, the reference signals including CRS, PSS, SSS, PRS, DRS, etc. exist and are continuous in the down link (DL) even though there is no data traffic on the channel. The continuous reference signals facilitate the user equipment performing the cell measurements, CSI reporting, time and frequency synchronization, etc. in some embodiments The user equipment performs these activities even during the period when the UE does not receive application data from the eNB in some embodiments. Systems and methods can accommodate compatibility issues associated with LAA and the legacy LTE standard including but not limited to issues related to physical layer (PHY) CSI reporting, PHY cell measurements, PHY timing estimation, etc., in some embodiments.

In some embodiments, a small cell requests to transmit legacy LTE reference signals (RSs) at specific, minimum, repetitive windows. The window position and length are predefined and broadcasted to user equipment through a control message similar to the system information message. The different LAA secondary component carriers (SCCs) (e.g., LTE signals in the unlicensed spectrum) can also have different offsets to allow the user equipment to measure for the SCCs separately in some embodiments. The repeatable window is a periodic window that can be also used to transmit LAA data traffic if an LAA data burst collides with the window position in some embodiments.

Due to carrier sense multiple access with collision avoidance (CSMA/CA) in the unlicensed band, the small cell cannot necessarily guarantee the exact time to transmit the LTE reference signals to generate the exact periodic time pattern in some embodiments. However, a strict repetitive pattern is not required in some embodiments. If the pattern is delayed by several subframes due to WIFI service, communication can still be achieved in some embodiments. The small cell or other device has the capability to detect the LTE signal from the other signals in some embodiments. For user equipment with activated LAA SCC, the user equipment continues to monitor each subframe and detect if the subframe is an LTE signal or not in some embodiments. If the user equipment captures an LTE signal, the user equipment performs CSI, cell RSRP/RSRQ measurements, timing estimation and frequency estimation in some embodiments. The approximately periodic LTE reference signal transmit window in the unlicensed spectrum allows the user equipment to have the minimum reference signals for the communication tasks in some embodiments.

For the user equipment to support LAA LTE, systems and methods do not assume that the reference signals in the LAA SCC are continuous in some embodiments. In some embodiments, the small cell, eNB, UE or other device in an LTE LAA environment includes an LTE signal detector or detection module. The signal detector detects whether a received signal in the unlicensed spectrum band is an LTE signal (e.g., a signal intended for an LTE communication) for each subframe in some embodiments. If the received signal is detected as an LTE signal in the unlicensed spectrum, the small cell, eNB, user equipment or other device in the LTE LAA environment uses CSI estimation, cell measurement, timing estimation and frequency estimation to determine if the subframe can be processed in some embodiments. If the received signal is detected as a non-LTE signal, the subframe data is dropped to avoid the wrong estimation and measurement results. Various methods can be used to perform LTE signal detection in some embodiments.

Referring generally to the figures, a framework for a small cell design that integrates a LAA LTE access point and one or more WIFI access points are shown and described. Small cells are low-powered nodes that operate in a various ranges. The small cells of the present disclosure are designed to operate at least in part in the unlicensed spectrum (e.g., a spectrum not reserved for a particular company, network, etc.). Although some embodiments of the disclosure are shown in a small cell device, some embodiments are used in user equipment without WIFI or other communication functionality outside the LTE or LTE LAA functionality or in an eNodeB or base transceiver station (BTS) without WIFI or other communication functionality outside the LTE or LTE LAA functionality in some embodiments. While various exemplary embodiments herein are discussed with respect to small cells (e.g., cells configured to service a relatively small area, such as a building or portion thereof), it should be understood that the present disclosure is not limited to application with small cells. For example, in various embodiments of the present disclosure, the systems and methods of the present disclosure are utilized and/or executed by larger LTE/LAA LTE cells and/or WIFI access points.

In some embodiments, the disclosure is related to a device including a circuit or module configured to detect whether a sub-frame is provided at least partially as an LTE signal in an unlicensed spectrum and process for channel state information, cell measurement, timing estimates or frequency estimates if the sub-frame is provided at least partially as the LTE signal in the unlicensed spectrum. In some embodiments, the disclosure is related to a device including a circuit or module configured to detect packet data control channel statistics or Viterbi statistics associated with received signal to determine whether the received signal is an LTE signal in an unlicensed spectrum, and detect whether a cyclical redundancy check associated with the packet data control channel statistics or Viterbi statistics passes to determine that the received signal is the LTE signal in an unlicensed spectrum. In some embodiments, the disclosure is related to a device including a circuit or module configured to detect whether packet data control channel statistics in a received signal are provided to determine whether the received signal is an LTE signal in an unlicensed spectrum, and if the packet data control channel statistics are not provided in the received signal, determine if packet data control channel statistics in a primary component carrier in the LTE spectrum or in a control secondary component carrier indicates if there is a resource allocation for a user equipment in the received signal to determine whether the received signal is the LTE signal in the unlicensed spectrum. In some embodiments, the disclosure is related to a device including a circuit or module configured to detect a signal-to-noise ratio associated with a cell-specific reference signal in a received signal to determine whether the received signal is an LTE signal in an unlicensed spectrum, and if the signal to noise ratio is above a threshold, determine that the received signal is the LTE signal in the unlicensed spectrum. In some embodiments, the disclosure is related to a device including a circuit or module configured to detect a cyclical prefix in a received signal to determine whether the received signal is an LTE signal in an unlicensed spectrum and determine that the cyclical prefix matches an end portion of an OFDM signal to determine that the received signal is the LTE signal in the unlicensed spectrum. In some embodiments, the disclosure is related to a device including a circuit or module configured to detect whether a received signal is a WIFI signal to determine whether the received signal is an LTE signal in an unlicensed spectrum and determine that the received signal is the LTE signal in the unlicensed spectrum if the received signal is not a WIFI signal. In some embodiments, the disclosure is related to a device including a circuit or module configured to provide a request for a repeatable window for transmitting LTE reference signals in an unlicensed spectrum and transmit the LTE reference signals in the unlicensed band during the window. Ins some embodiments, the disclosure is related to a method for achieving any of the operations discussed above.

Figure 2A:
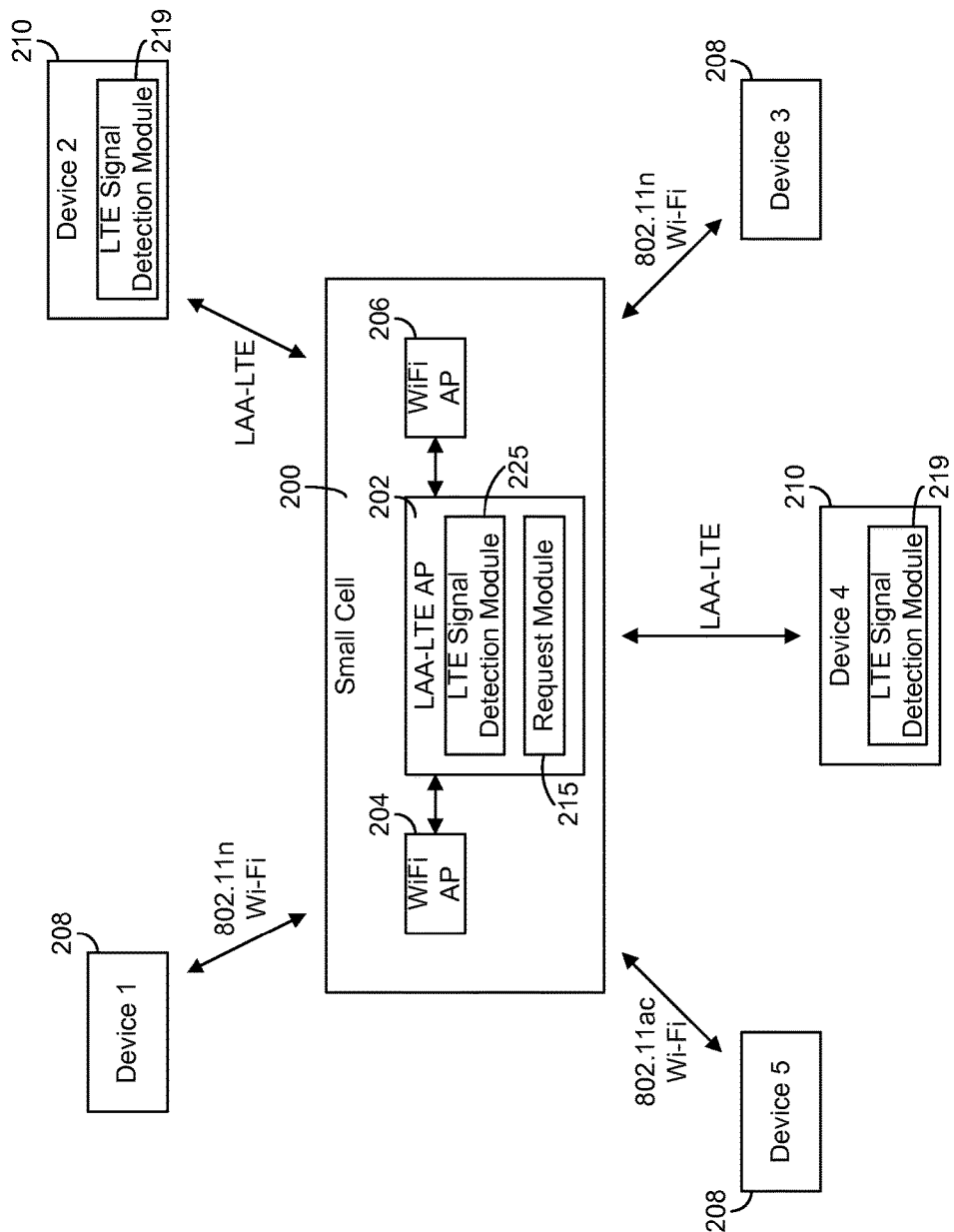
FIG. 2A is a block diagram depicting an embodiment of a system including a small cell and devices using licensed-assisted access long-term evolution (LLA LTE) and wireless local area network (WLAN) communications in accordance with some embodiments.

Referring to FIG. 2A, a small cell 200 is shown in communication with a number of devices 208 and 210. Small cell 200 is implementable in an environment, such as, an office, commercial or residential building, school, or any other type of environment in which devices connect wirelessly. Small cell 200 is configured to communicate with the various devices 208 and 210 by providing a network incorporating a variety of standards. For example, some devices 210 are shown communicating to small cell 200 via LAA LTE, and other devices 208 are shown communicating to small cell 200 via 802.11n WIFI or 802.11ac WIFI. It should be understood that the present disclosure can be adapted to accommodate a number of communication protocols for a number of devices 102 (FIG. 1A) and small cell 200. Small cell 200 can be or can be part of any of devices 102 or base stations 106 in FIG. 1A, and devices 208 and 210 can be or be part of any of devices 102 in some embodiments.

Small cell 200 includes a LAA LTE access point 202 and WIFI access points 204 and 206 in some embodiments. LAA LTE access point 202 is communicably coupled to the pair of WIFI access points 204, 206. While in the present disclosure a small cell 200 is described with a LAA LTE access point and two WIFI access points, in other embodiments, various other configurations of small cell 200 are possible. For example, in some embodiments, small cell 200 includes only LAA LTE access point 202, or LAA access point 202 in combination with only one of WIFI access points 204 and 206.

LAA LTE access point 202 includes a requester 215 and an LTE signal detector 225 in some embodiments. Requester 215 and LTE signal detector 225 provide operations to effect coordination and efficient processing of LTE signal in the unlicensed spectrum in some embodiments. Devices 210 include LTE signal detectors 219 in some embodiments. LTE signal detection detectors 219 are similar to LTE signal detector 225 in some embodiments. Requester 215 and signal detector 225 are implemented as devices in one or more of the PHY, media access control or logical link control (LLC) layers of access point 202 or software modules executed on a processing platform (e.g., associated with access point 202) in some embodiments. Various circuits and devices can be used to implement requester 215 and LTE signal detector 225.

LTE signal detector 225 allows small cell 200 to distinguish between LTE signals in the unlicensed spectrum and other signals, such as, WIFI signals, in some embodiments. Distinguishing between LTE signals and non-LTE signals in the unlicensed spectrum allows more efficient data communication, better channel estimations and cell measurements to be determined in some embodiments. LTE signal detector 219 allow devices 210 to distinguish between LTE signals in the unlicensed spectrum and other signals, such as, WIFI signals, in some embodiments Requester 215 is configured to cause small cell 200 to send a request for a window for LTE reference signals to be transmitted in accordance with the LTE standard in some embodiments. The request is sent from small cell 200 as a control message in some embodiments. The control message is sent as part of or in addition to LTE system information, such as, the master information block (MIB) and/or the system information blocks (SIBs) in some embodiments. The request is broadcast on the Physical Broadcast Channel (PBCH) or the Physical Downlink Shared Channel (PDSCH) through Radio Resource Control (RRC) messages in some embodiments.

The window is in LAA SCC in the unlicensed spectrum in some embodiments. The request is received by devices 208 and 210 after DL synchronization in some embodiments. The request sets a repetitive, pre-defined window position and length in some embodiments. Reference signals, such as CRS, PSS, SSS, PRS, and CSI-RS, are sent during the window. Different LAA SCC have different offsets to allow devices 210 to perform separate measurements related to the reference signals in some embodiments. The window is optionally used to transmit LAA LTE data traffic if an LAA LTE data burst collides with the window position in some embodiments. Small cell 200 follows CSMA/CA procedures to request the window for transmitting reference signals in some embodiments.

Figure 2B:
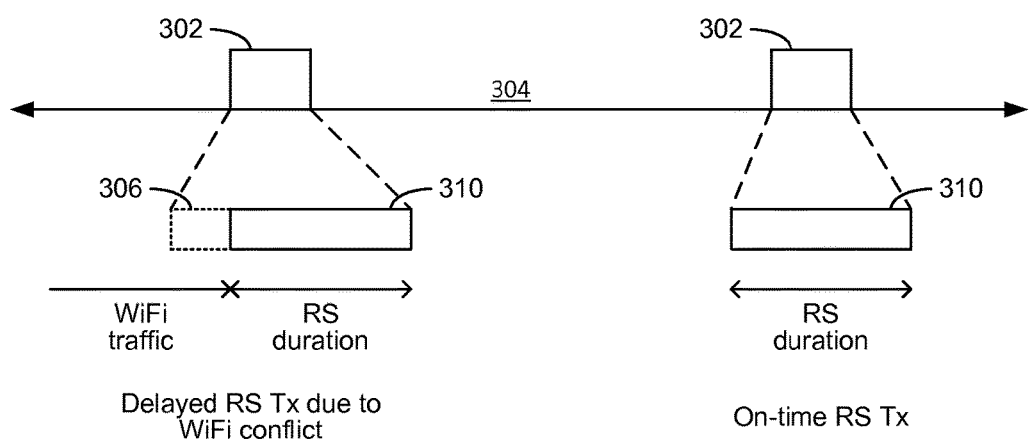
FIG. 2B is a timing diagram depicting windows for LTE reference signal transmission in the system illustrated in FIG. 2A in accordance with some embodiments.

As shown in FIG. 2B, windows 302 for transmitting reference signals are provided every cycle of an amount of time 304 in some embodiments. Amount of time 304 is predetermined and approximately constant in some embodiments. As LAA environments are often stationary environments, the frequency at which windows 302 are provided is not high (e.g, amount of time 304 can be longer than in mobile environments) in some embodiments. Windows 302 can be delayed by WIFI traffic 306; however, duration 310 of window 302 for transmitting reference signals remains the same length of time despite the delay in some embodiments. Duration 310 allows devices 210 to have at least minimum reference signals for communication tasks in some embodiments.

In some embodiments, devices 210 (e.g., UEs) with deactivated LAA SCC wake up periodically in windows 302 to monitor for LTE reference signals in the unlicensed spectrum. Devices 210 use LTE signal detector 219 to determine if the received signal is an LTE signal for each sub-frame and detect if the sub-frame is an LTE signal using LTE signal detector 219. Devices 210 perform CSI, cell reference signal received power/reference signal received quality (cell RSRP/RSRQ) measurements, timing estimation, and frequency estimation for LTE signals if the presence of the LTE signal is detected in some embodiments. If the LTE signal is not detected, CSI, cell RSRP/RSRQ measurements, timing estimation, and frequency estimation for LTE signals are not performed. After duration 310 is complete, devices 210 (FIG. 2A) can return to a sleep mode. Special rules can be applied for detecting and operating during a delay due to WIFI traffic 306 in some embodiments.

In some embodiments, devices 210 (e.g., UEs) with activated LAA SCC monitor each sub-frame and detect if the sub-frame is an LTE signal using LTE detector 219. Detector 219 is implemented as software executed on a processing platform (e.g. associated with device 210) in some embodiments. Various circuits can be used to implement detector 219. Detector 219 is similar to detector 225 in some embodiments.

Figure 2C:
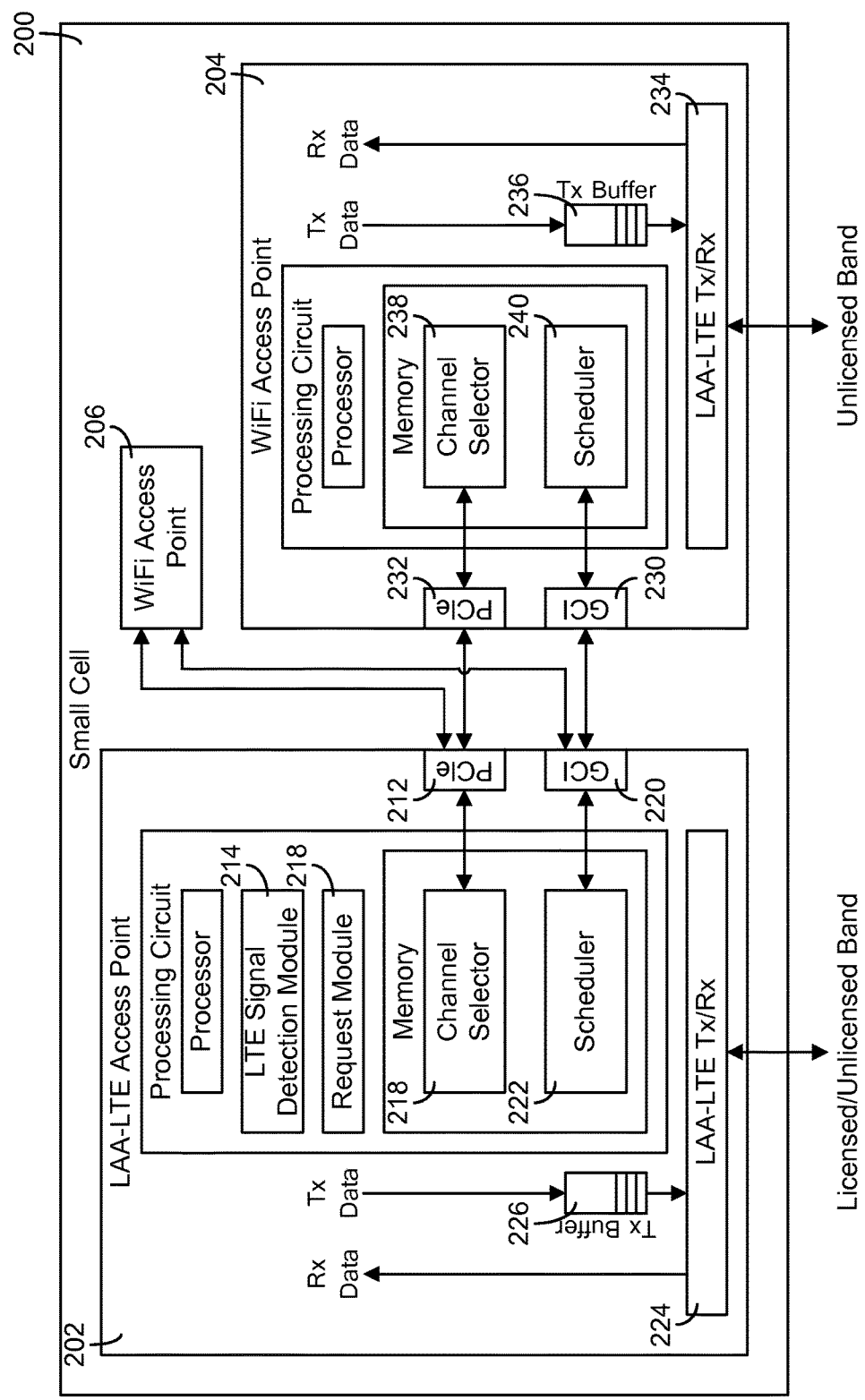
FIG. 2C is a more detailed block diagram of the small cell illustrated in FIG. 2A in accordance with some embodiments.

Referring more specifically to FIG. 2C, an example embodiment of small cell 200 is shown (only one WIFI access point 204 is shown in detail for space considerations; in some embodiments, WIFI access point 206 includes the same or similar components as base stations 106 (FIG. 2A)). LAA LTE access point 202 is coupled with the WIFI access points 204, 206 via a UART-based GCI interface 220, 230 and a PCIe interface 212, 232 in some embodiments. GCI interface 220, 230 is configured to carry real-time critical signals and messages, and PCIe interface 212, 232 is configured to carry non-real-time communications between the access points in some embodiments. Each access point 202, 204 is shown to generally include a transmitter/receiver circuit 224, 234 for transmitting and receiving data, and a buffer 226, 236 for receiving data. LAA LTE access point 202 further includes a channel selector 218 and scheduler 222, and WIFI access points 204, 206 further include a channel selector 238 and scheduler 240.

The access points 204 and 206 are further shown to include a processing circuit including a processor and memory. The memories are shown to include channel selector 218 and 238, and scheduler 222 and 240. Schedulers 222 and 240 schedule windows 302 (FIG. 2B) in some embodiments. In some embodiments, the memories further include other modules for controlling the activities of their respective access points. In some embodiments, the processors are, or include, one or more microprocessors, application specific integrated circuits (ASICs), circuits containing one or more processing components, a group of distributed processing components, circuitry for supporting a microprocessor, or other hardware configured for processing. The processors are configured to execute computer code stored in memory to complete and facilitate the activities described herein. The memories are any volatile or non-volatile computer-readable storage medium capable of storing data or computer code relating to the activities described herein. For example, the memories are shown to include modules which are computer code modules (e.g., executable code, object code, source code, script code, machine code, etc.) configured for execution by the processor. According to some embodiments, the processing circuits may represent a collection of processing devices (e.g., servers, data centers, etc.). In such cases, the processors represent the collective processors of the devices and the memories represent the collective storage devices of the devices. When executed by the processors, the processing circuits are configured to complete the activities described herein. In some embodiments, channel selectors 218 and 238 and/or schedulers 222 and 240 may be implemented outside of the memory (e.g., using hardware-based circuitry).

Figure 2D:
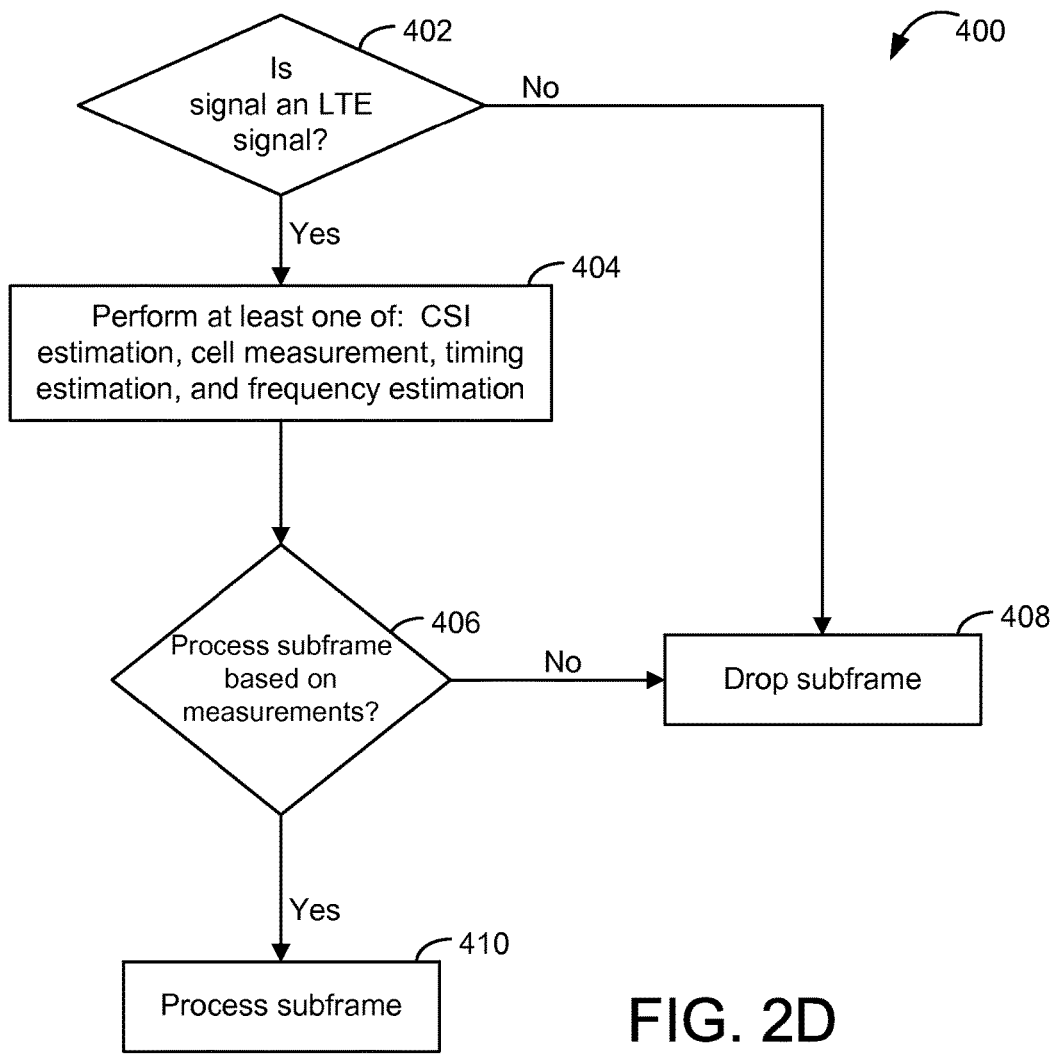
FIG. 2D is a diagram depicting an embodiment of a flow for communication in the system illustrated in FIG. 2A in accordance with some embodiments.

Referring now to FIG. 2D, one or more embodiments of a flow 400 for LAA LTE communications uses LTE signal detection. In some embodiments, the method includes determining, by one of LTE signal detector 225 of cell 200 or LTE detector 219 of device 210, whether a received signal in the unlicensed spectrum is an LTE signal (operation 402). The determination can be made according to various techniques, including but not limited to: using (E)PDCCH decoder statistics, Viterbi decoder statistics, (E)PDCCH decoding results from the primary channel carrier or control SCC, CRS detections, cyclic prefix properties of the orthogonal frequency division multiplex (OFDM) signal, or WIFI detection in one or more embodiments. (E)PDCCH refers to PDCCH or EPDCCH. More than one of the listed techniques can be utilized and voting techniques can be used to make the determine from results of several techniques in some embodiments. More than one of the above listed techniques can be utilized to increase the confidence in the determination in some embodiments.

Small cell 200 or devices 210 (FIG. 2A) perform at least one of: CSI estimation, cell measurement, timing estimation, and frequency estimation if the received signal is an LTE signal (an operation 404) in some embodiments. Small cell 200 or devices 210 perform CSI estimation, cell measurement, timing estimation, and frequency estimation to determine if the signal or sub-frame should be dropped at an operation 408 or processed at an operation 410. The determination to process the subframe is made by a CSI estimation module, cell measurement module, or timing estimation and frequency estimation module in some embodiments.

If the received signal is not an LTE signal as determined in operation 402, the signal or sub-frame is dropped by the device 210 or LAA LTE access point 202 (operation 408). Although dropped by the LAA LTE portion of device 210 or small cell 200, the signal can be further processed by other components of device 210 or small cell 200 (e.g., WIFI components).

Referring now to operation 402, small cell 200 and/or device 210 determines if the LAA SCC contains the (E)PDCCH or information related thereto to determine if the received signal is an LTE signal in some embodiments. If so, a passed CRC test in the (E)PDCCH decoder statistics indicates that the received signal is an LTE signal in some embodiments. The (E)PDCCH decoder statistics include convolution code and the CRC parameter in some embodiments. In some embodiments, small cell 200 and device 210 determines if cross scheduling is enabled and the LAA SCC contains the (E)PDCCH. If so, a passed CRC test in the (E)PDCCH decoder statistics indicates that the received signal is an LTE signal in some embodiments.

Small cell 200 and/or device 210 determine if Viterbi decoder statistics for the received sub-frame indicate a CRC failed case in operation 402 to determine if the received signal is an LTE signal in some embodiments. In some embodiments, the CRC failed case is determined from final path accumulation values, a path metric value difference between the best path and the second best path, or re-encoded statistics. If the Viterbi decoder statistics indicate a CRC failed case, the received signal is not an LTE signal. If not, a passed CRC case indicates that the received signal is an LTE signal in some embodiments.

Referring to operation 402, small cell 200 and/or device 210 determines if the LAA SCC contains the (E)PDCCH to determine if the received signal is an LTE signal in some embodiments. If not, (E)PDCCH decoding results from the PCC (e.g., LTE signal in the licensed spectrum) or control SCC are used to assist detection of the LTE signal by LTE signal detectors 225 and 219 in some embodiments. The (E)PDCCH decoding results from the PCC or control SCC can indicate if there is a resource allocation for device 210 (e.g., a UE) in the subframe of LAA SCC. This allocation indicates that the received signal is an LTE signal in some embodiments.

Referring to operation 402, small cell 200 and/or device 210 uses the cell-specific reference signal (CRS) to determine if the received signal is an LTE signal in some embodiments. Using the CRS in operation 402 does not depend on (E)PDCCH. The CRS is used to perform normal channel estimation and noise power estimation. If the signal-to-noise ratio (SNR) is sufficient, the received signal is considered to be an LTE signal in some embodiments. If not, an insufficient SNR indicates that the received signal is not an LTE signal in some embodiments.

Referring to operation 402, small cell 200 and/or device 210 uses a cyclic prefix (CP) property of the LTE OFDM symbol to detect the LTE signal in some embodiments. Using the CP property in operation 402 does not depend on (E)PDCCH. If the CP contains the same signals as an end portion of the OFDM signal, the received signal is considered to be an LTE signal in some embodiments. If not, the received signal is not an LTE signal in some embodiments.

Referring to operation 402, small cell 200 and/or device 210 can detect whether the received signal is a WIFI signal. If so, the received signal is not an LTE signal. Since most non-LTE signals in the unlicensed spectrum of a computing environment or data communication environments are WIFI signals, the determination that the received signal is not a WIFI signal is an indication that the received signal is an LTE signal in some embodiments. LTE signal detectors 225 and 219 detect WIFI signals by detecting PHY WLAN preambles and headers in some embodiments. LTE signal detectors 225 and 219 detect WIFI signals by the CP of WLAN OFDM in some embodiments.

Although the disclosure might reference one or more "users", such "users" can refer to user-associated devices, for example, consistent with the terms "user" and "multi-user" typically used in the context of a MU-MIMO environment. Although examples of communications systems described above can include devices and access points operating according to an IEEE 802.11, 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method comprising:
  determining, by an LTE signal detector of a wireless device, whether a received signal for a sub-frame is an LTE signal that is intended for an LTE communication in an unlicensed spectrum;
  in response to determining that the received signal is an LTE signal,
    determining, by the wireless device, whether to process the sub-frame based on at least one of channel state information, cell measurement, timing estimates, or frequency estimates;
    in response to determining that the sub-frame is to be processed, processing, by the wireless device, the sub-frame; and
    in response to determining that the sub-frame is not to be processed, dropping, by the wireless device, the sub-frame; and
  in response to determining that the received signal is not an LTE signal, dropping, by the wireless device, the sub-frame.

2. The method of claim 1, wherein determining whether the received signal is an LTE signal comprises detecting packet data control channel statistics or Viterbi statistics associated with the received signal.

3. The method of claim 1, wherein dropping the sub-frame avoids improper estimations or measurements.

4. The method of claim 2, wherein determining whether the received signal is an LTE signal comprises detecting whether a cyclical redundancy check associated with the packet data control channel statistics or Viterbi statistics passes.

5. The method of claim 1, wherein determining whether the received signal is an LTE signal comprises detecting a signal-to-noise ratio associated with a cell-specific reference signal in the received signal and determining the received signal is an LTE signal at least partially in response to the signal-to-noise ratio being above a threshold.

6. The method of claim 1, wherein the sub-frame is provided at least partially as a secondary component carrier.

7. A wireless device, comprising circuitry configured to:
    determine whether a received signal for a sub-frame is an LTE signal that is intended for an LTE communication in an unlicensed spectrum;
    in response to determining that the received signal is an LTE signal,
        determine whether to process the sub-frame based on at least one of channel state information, cell measurement, timing estimates, or frequency estimates;
        in response to determining that the sub-frame is to be processed, process the sub-frame; and
        in response to determining that the sub-frame is not to be processed, drop the sub-frame; and
    in response to determining that the received signal is not an LTE signal, drop the sub-frame.

8. The wireless device of claim 7, wherein the circuitry is further configured to detect packet data control channel statistics or Viterbi statistics associated with the received signal.

9. The wireless device of claim 8, wherein the circuitry is further configured to detect whether a cyclical redundancy check associated with the packet data control channel statistics or Viterbi statistics passes.

10. The wireless device of claim 7, wherein dropping the sub-frame avoids improper estimations or measurements.

11. The wireless device of claim 7, wherein the circuitry is further configured to detect a signal-to-noise ratio associated with a cell-specific reference signal in the received signal and determine the received signal is an LTE signal at least partially in response to the signal-to-noise ratio being above a threshold.

12. The wireless device of claim 7, wherein the sub-frame is provided at least partially as a secondary component carrier.

13. A non-transitory computer-readable medium embodying a program executable by processing circuitry, the program being configured to:
    determine whether a received signal for a sub-frame is an LTE signal that is intended for an LTE communication in an unlicensed spectrum;
    in response to determining that the received signal is an LTE signal,
        determine whether to process the sub-frame based on at least one of channel state information, cell measurement, timing estimates, or frequency estimates;
        in response to determining that the sub-frame is to be processed, process the sub-frame; and
        in response to determining that the sub-frame is not to be processed, drop the sub-frame; and
    in response to determining that the received signal is not an LTE signal, drop the sub-frame.

14. The non-transitory computer-readable medium of claim 13, wherein the program is further configured to detect packet data control channel statistics or Viterbi statistics associated with the received signal.

15. The non-transitory computer-readable medium of claim 14, wherein the program is thither configured to detect whether a cyclical redundancy check associated with the packet data control channel statistics or Viterbi statistics passes.

16. The non-transitory computer-readable medium of claim 13, wherein dropping the sub-frame avoids improper estimations or measurements.

17. The non-transitory computer-readable medium of claim 13, wherein the program is further configured to detect a signal-to-noise ratio associated with a cell-specific reference signal in the received signal and determine the received signal is an LTE signal at least partially in response to the signal-to-noise ratio being above a threshold.

18. The non-transitory computer-readable medium of claim 13, wherein the sub-frame is provided at least partially as a secondary component carrier.

19. The non-transitory computer-readable medium of claim 13, wherein the program is further configured to process for the at least one of channel state information, cell measurement, timing estimates, or frequency estimates.

20. The non-transitory computer-readable medium of claim 13, wherein the program is further configured to distinguish between LTE signals and other signals in the unlicensed spectrum.

* * * * *